US010850604B2

(12) United States Patent
Pieper et al.

(10) Patent No.: US 10,850,604 B2
(45) Date of Patent: Dec. 1, 2020

(54) CLUTCH ARRANGEMENT AND DRIVE TRAIN FOR A MOTOR VEHICLE

(71) Applicant: Schaeffler Technologies AG & Co. KG, Herzogenaurach (DE)

(72) Inventors: Torsten Pieper, Karlsruhe (DE); Rolf Meinhard, Bühl (DE)

(73) Assignee: Schaffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/068,917

(22) PCT Filed: Jan. 3, 2017

(86) PCT No.: PCT/DE2017/100000
§ 371 (c)(1),
(2) Date: Jul. 10, 2018

(87) PCT Pub. No.: WO2017/129165
PCT Pub. Date: Aug. 3, 2017

(65) Prior Publication Data
US 2019/0016207 A1    Jan. 17, 2019

(30) Foreign Application Priority Data

Jan. 29, 2016  (DE) .................. 10 2016 201 399
Mar. 2, 2016   (DE) .................. 10 2016 203 384

(51) Int. Cl.
B60K 6/387    (2007.10)
F16D 25/10    (2006.01)
(Continued)

(52) U.S. Cl.
CPC .............. B60K 6/387 (2013.01); F16D 13/52 (2013.01); F16D 13/76 (2013.01); F16D 21/02 (2013.01);
(Continued)

(58) Field of Classification Search
None
See application file for complete search history.

(56) References Cited

U.S. PATENT DOCUMENTS 8,757,305 B2 *   6/2014  Roske ................. B60K 6/38
                                                180/65.22
2007/0256907 A1 * 11/2007  Gremplini ............ F16D 21/06
                                                192/48.619
(Continued)

FOREIGN PATENT DOCUMENTS

CN    102575722 A    11/2010
CN    10440058 A     2/2015
(Continued)

OTHER PUBLICATIONS

DE102015213516 translation (Year: 2015).*
(Continued)

Primary Examiner — Timothy Hannon
(74) Attorney, Agent, or Firm — Kevin Parks

(57) ABSTRACT

A clutch arrangement for a drive train of a motor vehicle having a hybrid drive includes a first clutch, a second clutch, a central bearing, and a clutch actuator. The first clutch has a first clutch first rotating part and a plurality of connecting segments. The connecting segments are connected to one another for conjoint rotation in a coupled position of the first clutch. The second clutch has a second clutch first rotating part with a shaft region. The second clutch first rotating part is connected for conjoint rotation with the first clutch first rotating part. The central bearing is arranged on the shaft region. The clutch actuator is arranged to interact with the first clutch. The connecting segments are arranged radially to the outside of the clutch actuator. The clutch actuator is arranged radially to the outside of the central bearing. The first clutch, the clutch actuator and the central bearing are (Continued)

arranged at least partially overlapping one another in an axial direction.

13 Claims, 2 Drawing Sheets

(51) Int. Cl.
  *F16D 21/08* (2006.01)
  *F16D 13/52* (2006.01)
  *F16D 13/76* (2006.01)
  *F16D 21/02* (2006.01)
(52) U.S. Cl.
  CPC ............. *F16D 21/08* (2013.01); *F16D 25/10* (2013.01); *B60Y 2200/92* (2013.01)

(56) References Cited

U.S. PATENT DOCUMENTS

| | | | | |
|---|---|---|---|---|
| 2009/0166109 A1* | 7/2009 | Duan | ................ | B60K 6/383 180/65.28 |
| 2010/0288597 A1* | 11/2010 | Kuwahara | ............. | B60K 6/387 192/85.61 |
| 2010/0326785 A1* | 12/2010 | Schrage | .................. | B60K 6/26 192/70.12 |
| 2011/0259698 A1* | 10/2011 | Arnold | .................... | B60K 6/36 192/48.1 |
| 2015/0083546 A1* | 3/2015 | Moser | ................... | B60K 6/383 192/41 R |

FOREIGN PATENT DOCUMENTS

| | | | | |
|---|---|---|---|---|
| DE | 3607701 | A1 | 9/1987 | |
| DE | 3701912 | A1 | 8/1988 | |
| DE | 10297304 | T5 | 12/2004 | |
| DE | 102011100256 | A1 * | 10/2012 | ............ B60K 6/405 |
| DE | 102011117781 | A1 * | 5/2013 | |
| DE | 102014213818 | A1 | 1/2016 | |
| DE | 102015213516 | A1 * | 1/2017 | ............ B60K 6/365 |
| EP | 1808612 | A1 | 7/2007 | |
| WO | 2013167361 | A1 | 11/2013 | |

OTHER PUBLICATIONS

DE 102011100256 translation (Year: 2011).*
International Search Report for PCT/DE2017/100000; 3 pgs; dated Apr. 18, 2017 by European Patent Office.

* cited by examiner

Clutch Arrangement and Drive Train for a Motor Vehicle

CROSS-REFERENCE TO RELATED APPLICATIONS

This application is the United States National Phase of PCT Appln. No. PCT/DE2017/100000 filed Jan. 3, 2017, which claims priority to German Application Nos. DE102016201399.8 filed Jan. 29, 2016 and DE102016203384.0 filed Mar. 2, 2016, the entire disclosures of which are incorporated by reference herein.

TECHNICAL FIELD

The present disclosure relates to a clutch arrangement for a drive train of a motor vehicle including a hybrid drive and to the drive train for a motor vehicle, which has an axis-parallel hybrid drive having an electric machine coupled via a belt and a belt pulley.

BRIEF SUMMARY

The present disclosure provides a drive train for a motor vehicle including a hybrid drive, which drive train has a reduced overall length.

In this case, a clutch arrangement is suitable/prepared/designed for a drive train of a motor vehicle including a hybrid drive and has two clutches, which each have at least two rotating parts that can be rotationally decoupled from one another. The clutches, in turn, are mounted so as to be rotatable about a common axis of rotation. A first rotating part of a first clutch is both connected for conjoint rotation to a first rotating part of a second clutch and has a torque transfer region for interacting with an electric machine, and the at least two rotating parts of the first clutch have multiple plate-like connecting segments, which are connected to one another for conjoint rotation in a coupled position of the first clutch. The clutch arrangement also has a central bearing that is arranged on a shaft region of the first rotating part of the second clutch, as well as a clutch actuator interacting with the first clutch. The connecting segments of the first clutch are arranged radially to the outside of the clutch actuator, and the clutch actuator, in turn, is arranged radially to the outside of the central bearing, and the first clutch, the clutch actuator and the central bearing are arranged at least partially overlapping/overhanging one another in an axial direction.

Particularly by virtue of the nested arrangement of the first clutch, the clutch actuator and the central bearing, the clutch arrangement is of short configuration in its overall length.

Accordingly, it is also advantageous if the torque transfer region is formed by a belt pulley, which interacts with a belt of the electric machine during the operation of the drive train. As a result, axis-parallel arrangement of the electric machine with the axis of rotation of the clutch is implemented in a particularly simple manner. The electric machine is coupled to the first clutch over a short path via the belt and the belt pulley.

In this context, it is furthermore expedient if a belt contour of the belt pulley, said contour being designed to receive the belt in positive and/or frictional or purely nonpositive engagement, is arranged to the outside of the connecting segments in the radial direction. Thus, the belt pulley is at least partially arranged further out than the first clutch in the radial direction, and the clutch arrangement is of even more compact construction.

If the two clutches are connected to one another in such a way in the region of the first rotating parts thereof that the central bearing forms a common bearing assembly for supporting both the first clutch and the second clutch, the number of bearing locations is further reduced and thus, in turn, space is saved. Moreover, misalignment of the two bearing locations due to axis deviations is prevented.

It is furthermore advantageous if the clutch actuator has a central clutch disengaging and/or engaging device (e.g., a central disengaging device) and an actuation bearing (e.g., a release bearing), which are arranged offset relative to one another in the radial direction and are arranged at least partially overlapping one another in the axial direction. As a result, the clutch actuator, in particular, is arranged in an even more compact way.

If the actuation bearing is arranged to the outside of the central disengaging and/or engaging device in the radial direction, the first clutch is designed as a normally closed clutch, and the actuation bearing is in a direct operative connection with the first clutch in such a way that the first clutch opens from a rest position due to actuation of the central disengaging and/or engaging device, the clutch arrangement is suitable particularly for use in a drive train of a hybrid vehicle.

If the central disengaging and/or engaging device is arranged to the outside of the actuation bearing in the radial direction, the first clutch is designed as a normally open clutch, and the actuation bearing is in a direct operative connection with the first clutch in such a way that the first clutch closes from a rest position due to actuation of the central disengaging and/or engaging device, the clutch arrangement is likewise particularly suitable for use in a drive train of a hybrid vehicle.

It is furthermore expedient if the clutch actuator is a hydraulic clutch actuator. This is because a hydraulic clutch actuator, together with its hydraulic supply lines, can once again be integrated in a space-saving manner into the clutch arrangement. It is also advantageous here if a hydraulic channel for the hydraulic actuation of the clutch actuator is provided, leading/extending outward in the radial direction from the clutch actuator.

It is furthermore advantageous if the second clutch is designed as a dual clutch, e.g., as a wet/wet-running or a dry/dry-running, dual clutch. In further embodiments, the second clutch may also be designed as a manual clutch or automatic clutch or semiautomatic clutch, as a further preference as a converter/converter unit.

A drive train for a motor vehicle including a hybrid drive has a clutch arrangement in accordance with one of the embodiments explained above. As a result, the drive train too is of particularly compact configuration.

According to another aspect, the drive train for a motor vehicle including a hybrid drive has an electric machine, a transmission input shaft, the clutch actuator, the first clutch as a separating clutch for coupling/decoupling an internal combustion engine in response to actuation of the clutch actuator, the second clutch as a clutch unit, which is arranged between the first clutch and the transmission input shaft, and the central bearing. The first clutch, the clutch actuator and the central bearing are arranged in this sequence from the outside inward in a radial direction, and the first clutch, the clutch actuator and the central bearing are arranged at least partially overlapping one another in an axial direction. Owing to the fact that the first clutch, the clutch actuator and the central bearing, which overlap at least partially in the axial direction, are arranged in a nested manner in the radial direction, there is no need to arrange them adjacent to one another in the axial direction. This makes it possible to reduce an overall length.

If a hydraulic channel for the hydraulic actuation of the clutch actuator is provided in such a way as once again to lead outward in a radial direction from the clutch actuator, the clutch actuator can also be integrated in a particularly space-saving manner into the drive train.

BRIEF DESCRIPTION OF THE DRAWINGS

The present disclosure is explained in greater detail below by means of the description of illustrative embodiments with reference to figures.
In the drawing.

DETAILED DESCRIPTION

The figures are of a purely schematic nature and serve only for understanding. Identical elements are provided with identical reference signs.

Figure 1:
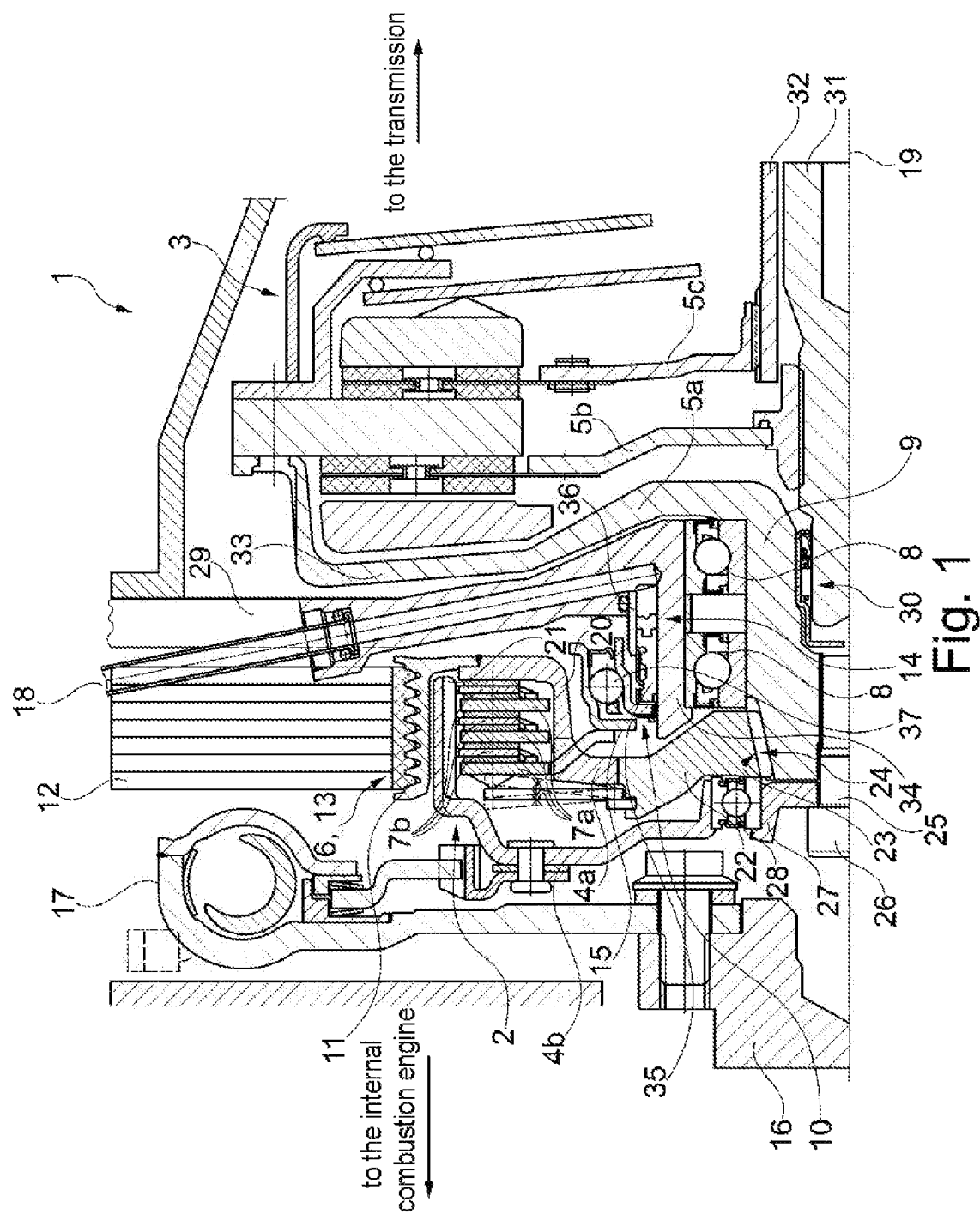
FIG. 1 shows a schematic longitudinal section through a drive train, which is shown in the region of a clutch arrangement in accordance with the first illustrative embodiment.

FIG. 1 shows schematically a construction of a relevant part of a drive train for a motor vehicle including a hybrid drive in accordance with the first illustrative embodiment. A clutch arrangement 1 is inserted in the drive train between an output shaft 16 of a combustion engine/internal combustion engine (not shown specifically here for the sake of clarity) and a (first) transmission input shaft 31 of a transmission (not shown). An electric machine (not shown specifically for the sake of clarity) also interacts with the clutch arrangement 1. During the operation of the drive train, the clutch arrangement 1 serves as a switchable element for connecting the electric machine to the output shaft 16 or to the transmission input shaft 31/32 or for connecting the output shaft 16 to the transmission input shaft 31/32.

It can be seen in FIG. 1 that the clutch arrangement 1 has a first clutch 2, which is designed as a separating clutch, and a second clutch 3, which is designed as a clutch unit. Furthermore, there is a clutch actuator 10, as described in greater detail below, having a central disengaging device 14 and an actuation bearing 15/release bearing. A hydraulic channel 18 is hydraulically connected to the central disengaging device 14, i.e. the clutch actuator 10 is designed as a hydraulic clutch actuator 10. A vibration damper 17 adjoins the clutch arrangement 1 in the direction of the output shaft 16.

The first clutch 2 is arranged between the vibration damper 17 and the second clutch 3 and is operatively coupled thereto. The vibration damper 17 is designed as a dual-mass flywheel. The second clutch 3 is designed as a (dry) dual clutch. However, manual clutches, wet dual clutches and converters are also conceivable for the second clutch 3. The vibration damper 17 is coupled to the output shaft 16 of the internal combustion engine.

The first clutch 2 is a friction clutch. In particular, the first clutch 2 is designed as a dry plate clutch/dry multiplate clutch, i.e. as a dry-running friction clutch which has a plurality of plate-shaped/plate-type connecting elements 7a, 7b. The first clutch 2 furthermore has a first rotating part 4a, which is similar in shape to a basket. The first rotating part 4a is designed as a plate carrier (also referred to as an inner plate carrier) and receives a plurality of first plate-shaped connecting segments 7a in a manner which prevents relative rotation but allows movement in the axial direction, i.e. along an axis of rotation 19. In particular, the first connecting segments 7a are arranged/mounted on a first sleeve-shaped supporting section 20 of the first rotating part 4a. A plurality of second plate-shaped connecting segments 7b of a second (basket-shaped) rotating part 4b, once again in the form of a plate carrier (also referred to as an outer plate carrier), of the first clutch 2 interact with the first plate-shaped connecting segments 7a. The second connecting segments 7b are, in turn, connected for conjoint rotation to the second rotating part 4b and mounted in a manner which allows axial movement. In particular, the second connecting segments 7b are arranged/mounted on a second sleeve-shaped supporting section 21 of the second rotating part 4b. In a decoupled position of the first clutch 2, the connecting segments 7a and 7b, which are also referred to as plates and are aligned in a radial direction with respect to the axis of rotation 19, are connected to one another for conjoint rotation by frictional engagement and, in a decoupled position of the first clutch 2, they are spaced apart in such a way that no torque is transferred between them. The rotating parts 4a, 4b of the first clutch 2 extend in such a way that the first supporting section 20 is arranged radially to the inside of the second supporting section 21.

The second rotating part 4b is coupled for conjoint rotation to the vibration damper 17. The first rotating part 4a is connected for conjoint rotation to a first rotating part 5a of the second clutch 3. The first rotating part 5a, in turn, forms an intermediate carrier. To be more precise, the first rotating part 4a is coupled for conjoint rotation to a shaft region 9 in the form of an intermediate carrier of the first rotating part 5a of the second clutch 3, said shaft region extending in the axial direction of the clutch arrangement 1 (i.e. in relation to the axis of rotation 19).

On its first rotating part 4a, the first clutch 2 furthermore has a torque transfer region 6, which is operatively connected during operation to the electric machine/electric motor, namely a drive shaft of the electric machine which is arranged parallel to the axis of rotation 19 of the clutch arrangement 1. Here, the torque transfer region 6 is designed as a belt pulley 11. The belt pulley 11 has an annular extent. A belt contour 13 is formed on a radial outer side of the belt pulley 11, said contour providing guidance in the axial direction for a belt 12, which, in turn, is coupled to the electric machine during operation, and implementing positive and nonpositive input and output at the first rotating part 4a. The belt pulley 11 is individually shaped and secured on a basket-shaped main body 22 of the first rotating part 4a, namely secured by a material bond via a weld. As an alternative or in addition, serrations or a polygon joint between flanges of the belt pulley 11 and the main body 22 are/is also provided here. The belt contour 13 is arranged radially to the outside of the connecting segments 7a, 7b of the two rotating parts 4a, 4b of the first clutch 2. The belt contour 13 also overlaps/covers the connecting segments 7a, 7b as a whole in the axial direction.

The second clutch 3 is designed as a clutch unit, namely as a dual clutch. The second clutch 3 is coupled to the transmission input shaft 31 of a transmission (not shown). As already mentioned, the second clutch 3 is connected for conjoint rotation, by means of the first rotating part 5a thereof, to the first rotating part 4a of the first clutch 2. For this purpose, the shaft region 9 is connected for conjoint rotation, by means of a positive-locking, conical (first) connecting region 23 to a second connecting region 24, of complementary design thereto, on a radial inner side of the main body 22. The positive-locking connection between the two first rotating parts 4a, 5a may be implemented by means of serrations or of a polygon joint. The main body 22 is secured on the first rotating part 5a in its shaft region 9 by means of a fastening device 25 in the form of a screw. The fastening device 25 is arranged coaxially with the axis of rotation 19 and is thus also referred to as a shaft/intermediate shaft.

A supporting ring 27 is inserted axially between a head 26/screw head of the fastening device 25 and an axial side of the two first rotating parts 4a, 5a, said axial side facing the vibration damper 17, and is connected by the fastening device 25 to the first rotating part 5a of the second clutch 3. A radial support bearing 28/radial bearing in the form of a rolling bearing, namely a ball bearing, is, in turn, mounted on the support ring 27. The support bearing 28 serves to provide rotary support for the first rotating part 4a relative to the second rotating part 4b, in particular in the open/decoupled position of the first clutch 2. Thus, the second rotating part 4b of the first clutch 2 is supported rotatably relative to the shaft region 9/the intermediate carrier by means of the support bearing 28. The support bearing 28 is arranged on the shaft region 9 (by means of the supporting ring 27), axially to the outside of an intermediate wall 29 between the shaft region 9 and the vibration damper 17.

The output shaft 16 of the internal combustion engine and the fastening device 25/the intermediate shaft are coupled in such a way as to be rotatable relative to one another by a bearing, either in the form of the support bearing 28 or alternatively by a further bearing/rolling bearing (not shown here).

Moreover, the fastening device 25 or shaft region 9 is supported in such a way as to be rotatable relative to the transmission input shaft 31 by a bearing 30 in the form of a rolling bearing, namely a roller/needle bearing. Here, a second rotating part 5b, in the form of a clutch disk, of the second clutch 3 is connected for conjoint rotation to the transmission input shaft 31. By virtue of the embodiment of the second clutch 3 as a dual clutch, a third rotating part 5c of the second clutch 3, once again in the form of a clutch disk, is connected for conjoint rotation to a further, second transmission input shaft 32. Depending on the state/position of the second clutch 3, either the second rotating part 5b is connected for conjoint rotation to the first rotating part 5a (in a first coupled position of the second clutch 3) or the third rotating part 5c is connected for conjoint rotation to the first rotating part 5a (in a second coupled position of the second clutch 3), or (in a decoupled position of the second clutch 3) the second rotating part 5b and the third rotating part 5c are freely rotatable relative to the first rotating part 5a (in a decoupled position of the second clutch 3).

The first clutch 2 and the second clutch 3 form a common assembly unit. The shaft region 9 is connected for conjoint rotation to the fastening device 25. A central bearing 8 is arranged on a region of the shaft region 9 which extends in the axial direction. In particular, the central bearing 8 is arranged axially between the first connecting region 23 and a side wall region 33 of the first rotating part 5a which extends outward in a radial direction. The central bearing 8 is designed as a double-row angular ball bearing for axial and radial forces.

The central bearing 8 serves as an axial and radial support for the first rotating part 5a and, by virtue of the connection thereof to the first rotating part 4a, also as an axial and radial support for both first rotating parts 4a and 5a. The central bearing 8 is inserted between the shaft region 9 and the intermediate wall 29. The intermediate wall 29 is part of a clutch or transmission housing and is thus mounted in a manner fixed relative to the housing/fixed relative to the vehicle chassis during operation. The intermediate wall 29 is a functional component of the clutch arrangement 1. The intermediate wall 29 extends from the outside inward, between the side wall region 33 and the connecting segments 7a, 7b in the radial direction, as far as the central bearing 8. In a radial inner region, the intermediate wall 29 forms a sleeve-type supporting region 34, which extends in the axial direction and in which it is coupled to the central bearing 8.

The shaft region 9 is thus coupled for conjoint rotation to the second clutch 3 in such a way that the central bearing 8 supports both the belt pulley 11, via the shaft region 9, and the second clutch 3, and therefore there is no separate bearing for supporting the second clutch 3 on that side of the second clutch 3 which faces the shaft region 9.

Thus, the first rotating part 4a of the first clutch 2, an optional splined plate (supporting ring 27), a bearing flange, the support bearing 28 and a central screw (fastening device 25) form an assembly unit. The fastening device 25 carries the support bearing 28, which is of small dimensions, and preloads a flange joint of the first rotating part 4a of the first clutch 2. The assembly unit is mounted directly in the transmission by means of an intermediate wall 29. Internal combustion engine-transmission assembly takes place by means of splines, optionally with a bracing plate.

In the construction described above, actuating forces for the first clutch 2 and the second clutch 3 act only in an axial direction relative to the support bearing 28, and therefore retention of the bearing is necessary only in one direction.

Given the construction described above, a starter ring gear on the vibration damper 17 can furthermore be omitted since starting of the internal combustion engine may be performed by means of the electric machine via the belt pulley 11 and the belt 12.

A clutch actuator 10 is furthermore arranged radially to the outside of the central bearing 8, namely on the intermediate wall 29. The clutch actuator 10 serves as an actuating device for the first clutch 2 in order to switch said clutch between the coupled and the decoupled position thereof. The clutch actuator 10 is designed as a hydraulic clutch actuator 10. The clutch actuator 10 is thus part of a hydraulic actuating system. The clutch actuator 10 has a slave cylinder in the form of a central disengaging device 14. This central disengaging device 14 is coupled in an axially movable manner to an actuation bearing 15 in the form of a release bearing. In particular, a piston 35 of the central disengaging device 14 is supported in a manner which allows it to move relative to a housing 36 of the central disengaging device 14, said housing being mounted/formed in a fixed manner in the intermediate wall 29. The actuation bearing 15, which is configured as a rolling bearing, namely as a ball bearing, is shaped in such a way that the rolling elements 37 thereof are arranged radially to the outside of the piston 35. The actuation bearing 15, in turn, then exerts a pushing action in a conventional manner on the connecting segments 7a and 7b. As the designations central disengaging device 14 and release bearing already express, the first clutch 2 is designed as a normally engaged/closed clutch. In further embodiments, the first clutch 2 is also designed as a normally released/open clutch, and therefore the previous central disengaging device 14 is then designed as a central engaging device and the actuation bearing 15 is designed as an engagement bearing.

A hydraulic channel 18 is hydraulically connected to the central disengaging device 14 to hydraulically actuate the clutch actuator 10. The hydraulic channel 18 is partially introduced into the intermediate wall 29 and, in particular, extends radially outward from the central disengaging device 14. During the hydraulic actuation of the central disengaging device 14 out of a rest position, the actuation bearing 15 is moved in the axial direction (to the left in FIG. 1) and opens the first clutch 2, which is closed in the rest position. The first clutch 2 is actuated in a direct manner by means of the actuation bearing 15, i.e. without a lever or diaphragm spring tongues, as a result of which a short actuating travel is achieved.

Consequently, the first clutch 2 is arranged to the outside of the intermediate wall 29, in particular radially to the outside of the supporting region 34, between the shaft region 9 and the vibration damper 17. The belt pulley 11 is coupled for conjoint rotation to the shaft region 9 at a point further out in the radial direction than the connecting segments 7a, 7b of the first clutch 1.

Consequently, the central disengaging device 14 of the clutch actuator 10 is arranged radially further in than the actuation bearing 15 of the clutch actuator 10. The central disengaging device 14 and the actuation bearing 15 are arranged at least partially overlapping in an axial direction of the clutch arrangement 1.

The shaft region 9, which extends in the axial direction, is arranged between the first clutch 2 and the second clutch 3. The second clutch 3 and the hydraulic channel 18 are arranged in such a way as to be rotatable on the central bearing 8 relative to the shaft region 9, between two regions of the shaft region 9 which extend in the radial direction. The central bearing 8 is arranged on a region of the shaft region 9 which is situated on the inside in the radial direction and extends in the axial direction. This results in a construction in which the hydraulic channel 18 and the clutch actuator 10 are situated in a kind of intermediate wall formed by the two regions extending in the radial direction.

In the manner described above, the belt pulley 11, the first clutch 2, the actuation bearing 15, the central disengaging device 14 and the central bearing 8 are arranged in such a way as to be nested in the radial direction, and they overlap one another at least partially in the axial direction of the clutch arrangement 1/the axis of rotation 19.

Figure 2:
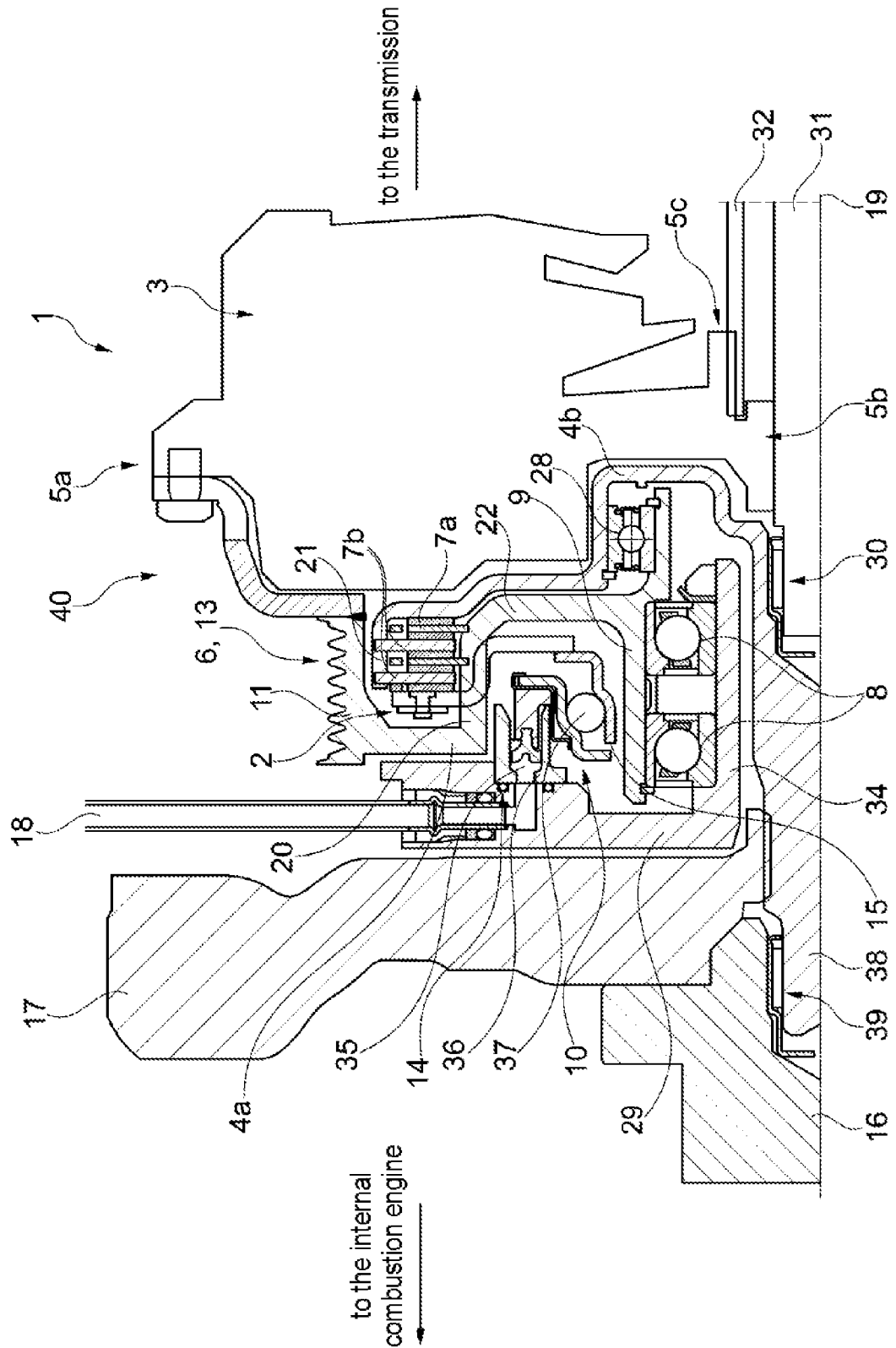
FIG. 2 shows a schematic longitudinal section through a drive train, which is shown in the region of a clutch arrangement in accordance with a second illustrative embodiment.

A second illustrative embodiment is described below with reference to FIG. 2. It should be noted that the second illustrative embodiment is identical to the first illustrative embodiment in design and operation, apart from the differences described below.

The first clutch 2 is arranged (axially) between the vibration damper 17 and the second clutch 3 and is coupled operatively thereto. The vibration damper 17 is designed as a dual-mass flywheel, and the second clutch 3 is designed as a dual-clutch arrangement/dual clutch. The vibration damper 17 is coupled to the internal combustion engine output shaft 16 of an internal combustion engine (not shown). The second clutch 3 is coupled inter alia to the (first) transmission input shaft 31 of a transmission (not shown).

The internal combustion engine output shaft 16 and an intermediate shaft 38, which is now formed on the second rotating part 4b, are coupled/supported in such a way as to be rotatable relative to one another by means of a bearing 39, which is designed as a rolling bearing. The intermediate shaft 38 and the first transmission input shaft 31 are, in turn, coupled/supported in such a way as to be rotatable relative to one another by means of bearing 30.

The first clutch 2 and the second clutch 3 form a common assembly unit. The shaft region/intermediate carrier 9 now formed on the first rotating part 4a is arranged in such a way as to be rotatable relative to the intermediate shaft 38. The central bearing 8 supports that region of the shaft region 9 which extends in the axial direction. The central bearing 8 is once again a double-row angular ball bearing for axial and radial forces. The clutch actuator 10 is coupled for conjoint rotation to a region (of the intermediate wall 29) which supports the central bearing 8.

The central disengaging device 14 of the clutch actuator 10 is arranged radially further out than the actuation bearing 15 of the clutch actuator 10. The central disengaging device 14 and the actuation bearing 15 are arranged at least partially overlapping one another in an axial direction. The clutch actuator 10 is a hydraulic clutch actuator. The hydraulic channel 18 is hydraulically connected to the central disengaging device 14 to hydraulically actuate the clutch actuator 10. During the hydraulic actuation of the central disengaging device 14 out of a rest position, the actuation bearing 15 is moved in the axial direction (to the right in FIG. 2) and closes the first clutch 2, which is open in the rest position. The first clutch 2 is actuated in a direct manner by means of the actuation bearing 15, i.e. without a lever or diaphragm spring tongues, as a result of which a short actuating travel is achieved. Return of the central disengaging device 14 to the rest position is accomplished by means of separate leaf springs, which leads to a saving of overall length in the axial direction in comparison with conventional helical compression springs, for example.

The first clutch 2 is a dry plate clutch. The first clutch 2 has an outer plate carrier in the form of the second rotating part 4b and an inner plate carrier in the form of the first rotating part 4a. The first rotating part 4a is coupled for conjoint rotation to the shaft region 9. The second rotating part 4b is coupled for conjoint rotation to the vibration damper 17 via the intermediate shaft 38. To be more precise, the first rotating part 4a is coupled for conjoint rotation to a region of the shaft region 9 which extends in the axial direction.

The shaft region 9 extending in the axial direction is arranged between the first clutch 2 and the second clutch 3. The clutch actuator 10 and the hydraulic channel 18 are arranged in such a way as to be rotatable relative to the shaft region 9/the second rotating part 4b, between a region of the first rotating part 4a which extends in the radial direction and the vibration damper 17. The central bearing 8 is arranged on a region (supporting region 34) which is situated on the inside in the radial direction and extends in the axial direction.

This results in a construction in which the hydraulic channel 18 and the clutch actuator 10 are situated in a kind of interspace formed by that region of the first rotating part 4a which extends in the radial direction and the vibration damper 17.

The first clutch 2 is arranged with its connecting segments 7a, 7b between the first rotating part 4a and the second clutch 3. The belt pulley 11 is arranged further out in the radial direction than the first clutch 2, i.e. the connecting segments 7a, 7b, and is coupled for conjoint rotation to the first rotating part 4a. The second rotating part 4b of the first clutch 2 is supported in such a way that it can be rotated relative to the first rotating part 4a via the support bearing 28, which is arranged on the first rotating part 4a (axially)

to the outside of the intermediate wall 29 between the first rotating part 4a and the second clutch 3.

The first rotating part 4a is coupled for conjoint rotation to the second clutch 3/the first rotating part 5a in such a way that the central bearing 8 supports both the belt pulley 11, via the first rotating part 4a, and the second clutch 3, and therefore there is no separate bearing to support the second clutch 3 on the side of the second clutch 3 which faces the first rotating part 4a. The belt pulley 11 and the first rotating part 4a of the first clutch 2 are supported via a common flange.

In the manner described above, the belt pulley 11, the first clutch 2, the actuation bearing 15, the central disengaging device 14 and the central bearing 8 are arranged in a nested manner in the radial direction and overlap one another at least partially in the axial direction. Moreover, the first clutch 2 and the second clutch 3 are partially nested in the radial direction.

The above-described assembly unit including the first clutch 2 and the second clutch 3 is mounted directly in the transmission by way of the intermediate wall 29. Internal combustion engine-transmission assembly takes place via a flange of the vibration damper 17.

In the construction described above, actuating forces for the first clutch 2 and the second clutch 3 act in opposite directions with respect to the support bearing 28, thereby reducing the load on the bearing and enabling smaller bearings to be used.

In the construction described above, it is once again furthermore possible to omit a starter ring gear on the vibration damper 17 since starting of the internal combustion engine can be performed by means of the electric machine via the belt pulley 11 and the belt 12.

Nesting an intermediate shaft bearing assembly within an installation space of the second clutch 3 and/or nesting a pressure pot within a rotor flange reduces the overall length in the axial direction.

As an additional feature of the arrangement, it may also be mentioned that the use of a centrifugal force pendulum (not shown specifically here for the sake of clarity) is also possible. In a further embodiment, this is conventionally secured on the dual-mass flywheel/the vibration damper 17 or, as a further preference, on the main body 22. As indicated in FIG. 2, the centrifugal force pendulum, when secured on the main body 22/on the first rotating part 4a, is arranged in a receiving space 40/installation space above the first clutch 2 (and preferably also above the second clutch 3), which once again saves axial installation space.

A drive train together with a clutch arrangement 1 for a motor vehicle including a hybrid drive may have an electric machine, a clutch actuator 10, a first clutch 2 as a separating clutch for coupling/decoupling an internal combustion engine in response to actuation of the clutch actuator 10, (at least) one transmission input shaft 31, 32, a second clutch 3 in the form of a clutch unit, which is arranged between the first clutch 2 and the transmission input shaft 31, 32, and a central bearing 8. The first clutch 2, the clutch actuator 10 and the central bearing 8 are arranged in this sequence from the outside inward in a radial direction. The first clutch 2, the clutch actuator 10 and the central bearing 8 are arranged at least partially overlapping one another in an axial direction.

Although the present disclosure has been described above by means of illustrative embodiments, it is self-evident that various configurations and modifications can be implemented without exceeding the scope of the present disclosure as defined in the accompanying claims.

As regards further features and advantages of the present disclosure, attention is drawn explicitly to the disclosure in the figures.

REFERENCE LABELS 1 clutch arrangement
2 first clutch
3 second clutch
4a first rotating part of the first clutch
4b second rotating part of the first clutch
5a first rotating part of the second clutch
5b second rotating part of the second clutch
5c third rotating part of the second clutch
6 torque transfer region
7a first connecting segment
7b second connecting segment
8 central bearing
9 shaft region
10 clutch actuator
11 belt pulley
12 belt
13 belt contour
14 central disengaging device
15 actuation bearing
16 output shaft
17 vibration damper
18 hydraulic channel
19 axis of rotation
20 first supporting section
21 second supporting section
22 main body
23 first connecting region
24 second connecting region
25 fastening device
26 head
27 supporting ring
28 support bearing
29 intermediate wall
30 bearing
31 first transmission input shaft
32 second transmission input shaft
33 side wall region
34 supporting region
35 piston
36 housing
37 rolling element
38 intermediate shaft
39 bearing
40 receiving space

The invention claimed is:

1. A clutch arrangement for a drive train of a motor vehicle having a hybrid drive, comprising:
a first clutch with a first clutch first rotating part and a plurality of connecting segments, the connecting segments being connected to one another for conjoint rotation in a coupled position of the first clutch;
a second clutch with a second clutch first rotating part with a shaft region, the second clutch first rotating part connected for conjoint rotation with the first clutch first rotating part;
a central bearing arranged on the shaft region; and,
a clutch actuator, comprising a non-rotating hydraulic piston and an actuation bearing, arranged to interact with the first clutch, wherein:
the connecting segments are arranged radially to the outside of the clutch actuator;

the clutch actuator is arranged radially to the outside of the central bearing; and, the first clutch, the non-rotating hydraulic piston or the actuation bearing, and the central bearing are arranged at least partially nested in a radial direction.

2. The clutch arrangement of claim 1, wherein the first clutch first rotating part comprises a torque transfer region with a belt pulley for interacting with a belt of an electric machine during operation of the drive train.

3. The clutch arrangement of claim 2, wherein the belt pulley comprises a belt contour arranged radially outside of the connecting segments, the belt contour being arranged to receive the belt in a positive or a frictional engagement.

4. The clutch arrangement of claim 1, wherein the central bearing forms a common bearing assembly for supporting the first clutch and the second clutch.

5. The clutch arrangement of claim 1, wherein the hydraulic piston is arranged offset and at least partially nested radially inside of or outside of the actuation bearing.

6. The clutch arrangement of claim 5, wherein:
the actuation bearing is arranged radially outside of the hydraulic piston;
the first clutch is a normally closed clutch;
the actuation bearing is directly connected to the first clutch; and,
the first clutch is arranged to open from a rest position when the hydraulic piston is actuated.

7. The clutch arrangement of claim 5, wherein:
the hydraulic piston is arranged radially outside of the actuation bearing;
the first clutch is a normally open clutch;
the actuation bearing is directly connected to the first clutch; and,
the first clutch is arranged to close from a rest position when the hydraulic piston is actuated.

8. The clutch arrangement of claim 1, wherein the clutch actuator is a hydraulic clutch actuator.

9. A drive train for a motor vehicle having a hybrid drive comprising the clutch arrangement of claim 1.

10. The drive train of claim 9, further comprising a hydraulic channel leading radially outward from the clutch actuator for hydraulic actuation of the clutch actuator.

11. The clutch arrangement of claim 1 wherein the first clutch, the actuation bearing, and the central bearing are arranged at least partially nested in a radial direction.

12. A clutch arrangement for a drive train of a motor vehicle having a hybrid drive, comprising:
a first clutch with a first clutch first rotating part and a plurality of connecting segments, the connecting segments being connected to one another for conjoint rotation in a coupled position of the first clutch;
a second clutch with a second clutch first rotating part with a shaft region, the second clutch first rotating part connected for conjoint rotation with the first clutch first rotating part;
a central bearing arranged on the shaft region; and,
a clutch actuator, comprising a hydraulic piston and an actuation bearing, arranged to interact with the first clutch, wherein:
the connecting segments are arranged entirely radially to the outside of the hydraulic piston;
the hydraulic piston is arranged entirely radially to the outside of the central bearing; and,
the first clutch, the hydraulic piston or the actuation bearing, and the central bearing are arranged at least partially nested in a radial direction.

13. A clutch arrangement for a drive train of a motor vehicle having a hybrid drive, comprising:
a first clutch with a first clutch first rotating part and a plurality of connecting segments, the connecting segments being connected to one another for conjoint rotation in a coupled position of the first clutch;
a second clutch with a second clutch first rotating part with a shaft region, the second clutch first rotating part connected for conjoint rotation with the first clutch first rotating part;
a central bearing arranged on the shaft region; and,
a clutch actuator, comprising a sealed hydraulic piston and an actuation bearing, arranged to interact with the first clutch, wherein:
the sealed hydraulic piston is displaceable by a hydraulic fluid to engage or disengage the first clutch;
the connecting segments are arranged radially to the outside of the clutch actuator;
the clutch actuator is arranged radially to the outside of the central bearing; and,
the first clutch, the sealed hydraulic piston or the actuation bearing, and the central bearing are arranged at least partially nested in a radial direction.

\* \* \* \* \*